Aug. 4, 1936.  H. F. GLUNZ  2,049,768
MACHINE FOR CAPPING AND SEALING CONTAINERS
Filed Jan. 13, 1932  5 Sheets-Sheet 1
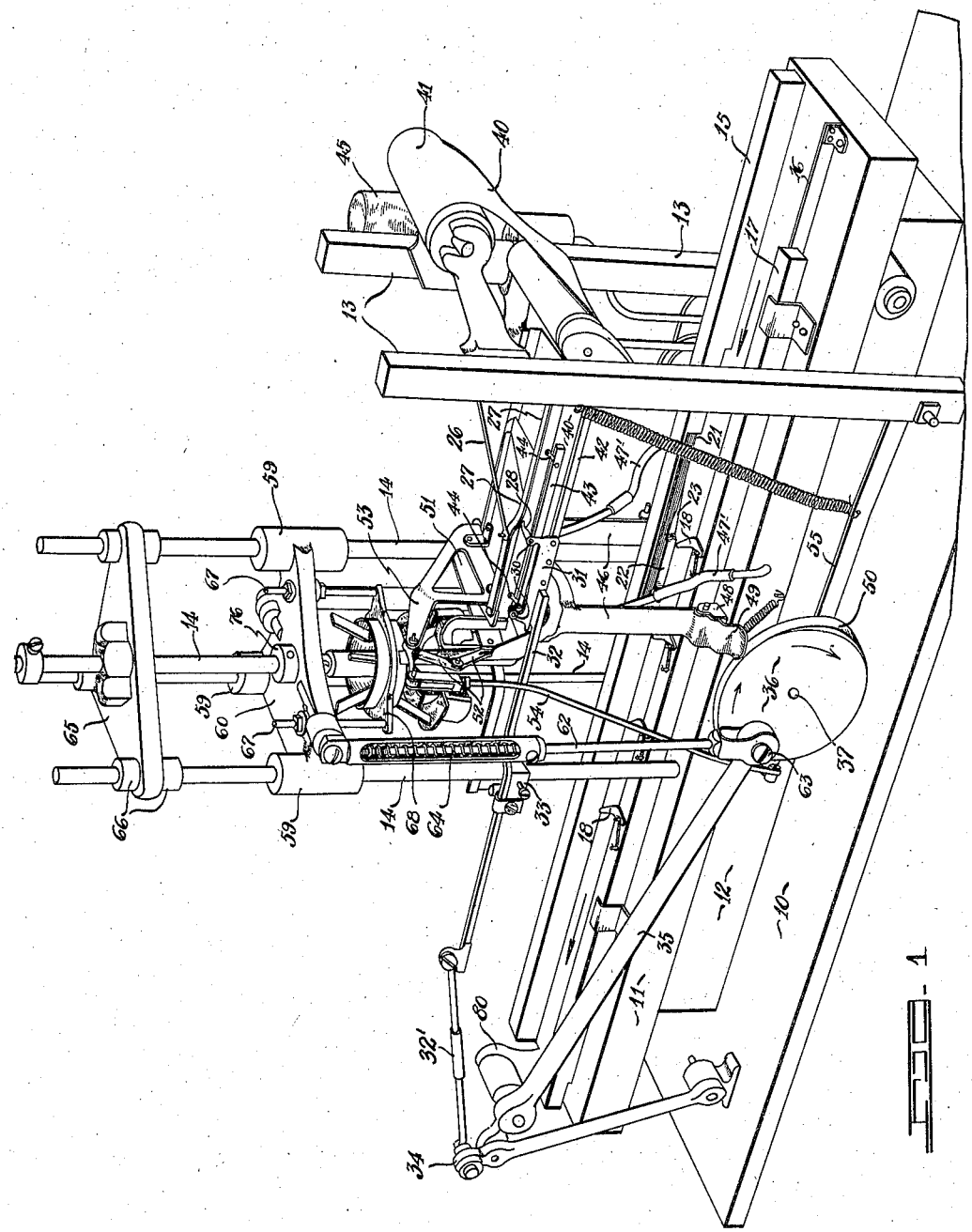
INVENTOR
HENRY F. GLUNZ
BY Darby & Darby
ATTORNEYS.

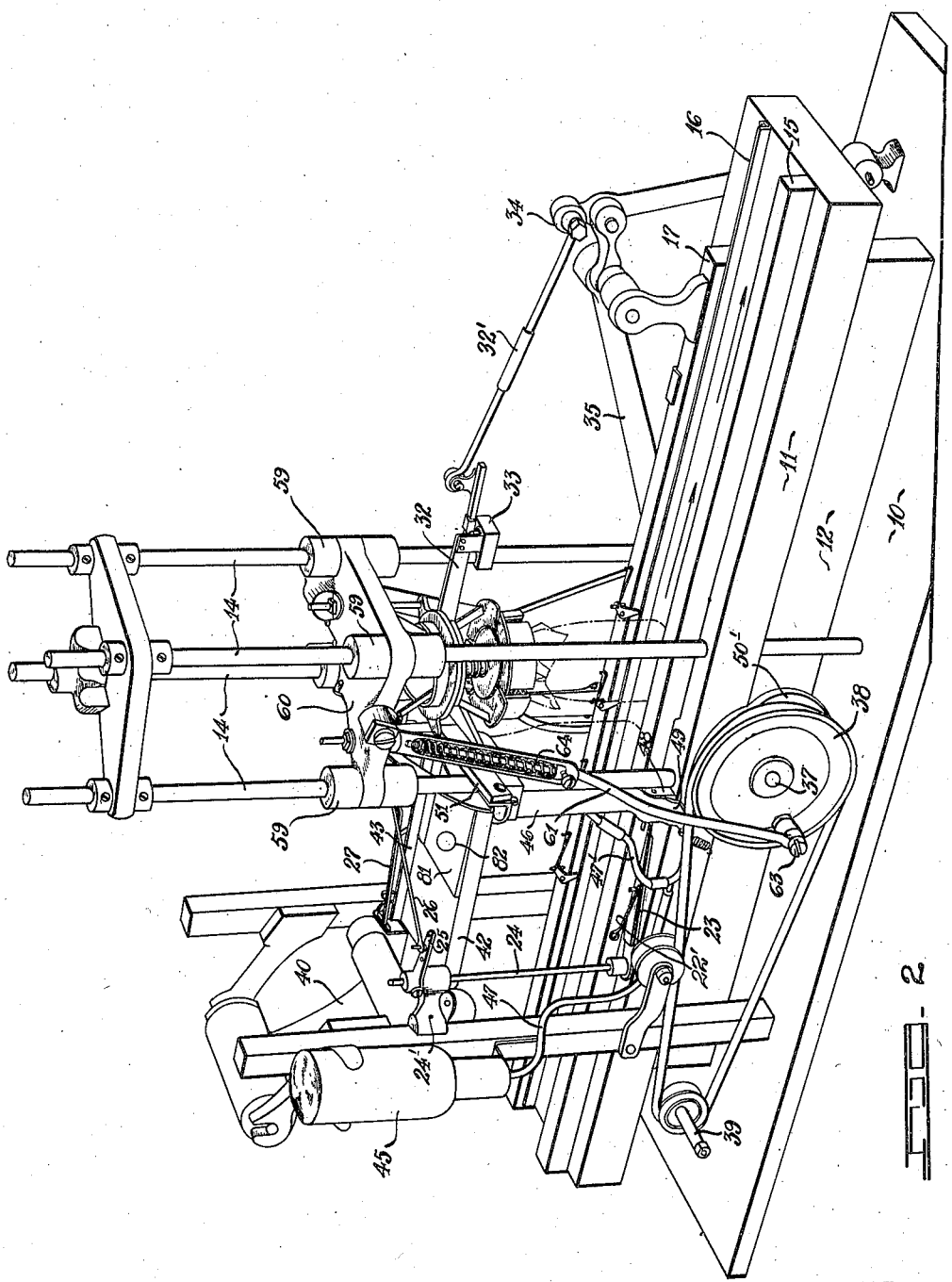

Aug. 4, 1936.  H. F. GLUNZ  2,049,768
MACHINE FOR CAPPING AND SEALING CONTAINERS
Filed Jan. 13, 1932  5 Sheets-Sheet 3
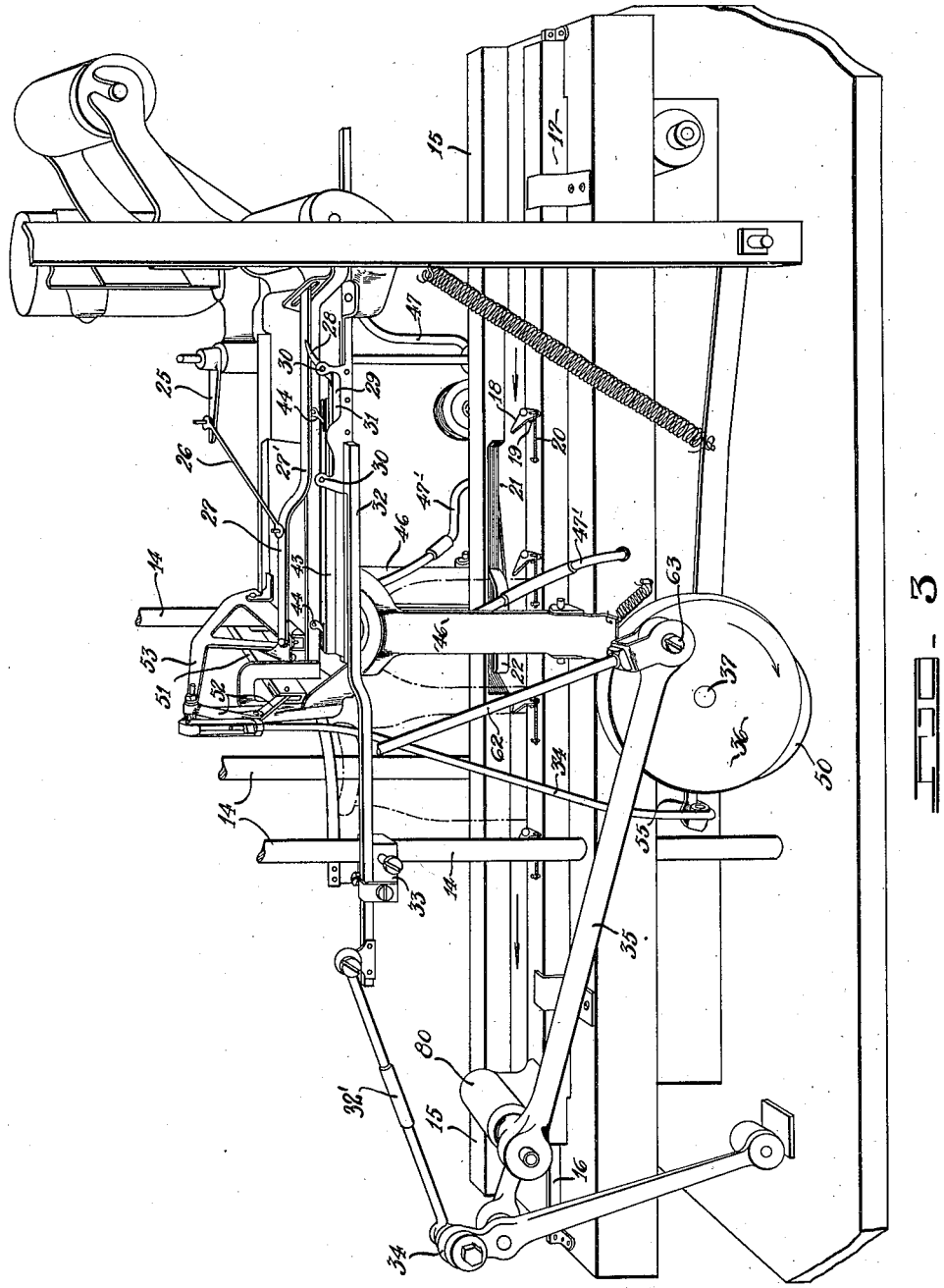
INVENTOR
HENRY F. GLUNZ
BY
ATTORNEYS.

Aug. 4, 1936. H. F. GLUNZ 2,049,768
MACHINE FOR CAPPING AND SEALING CONTAINERS
Filed Jan. 13, 1932 5 Sheets-Sheet 4
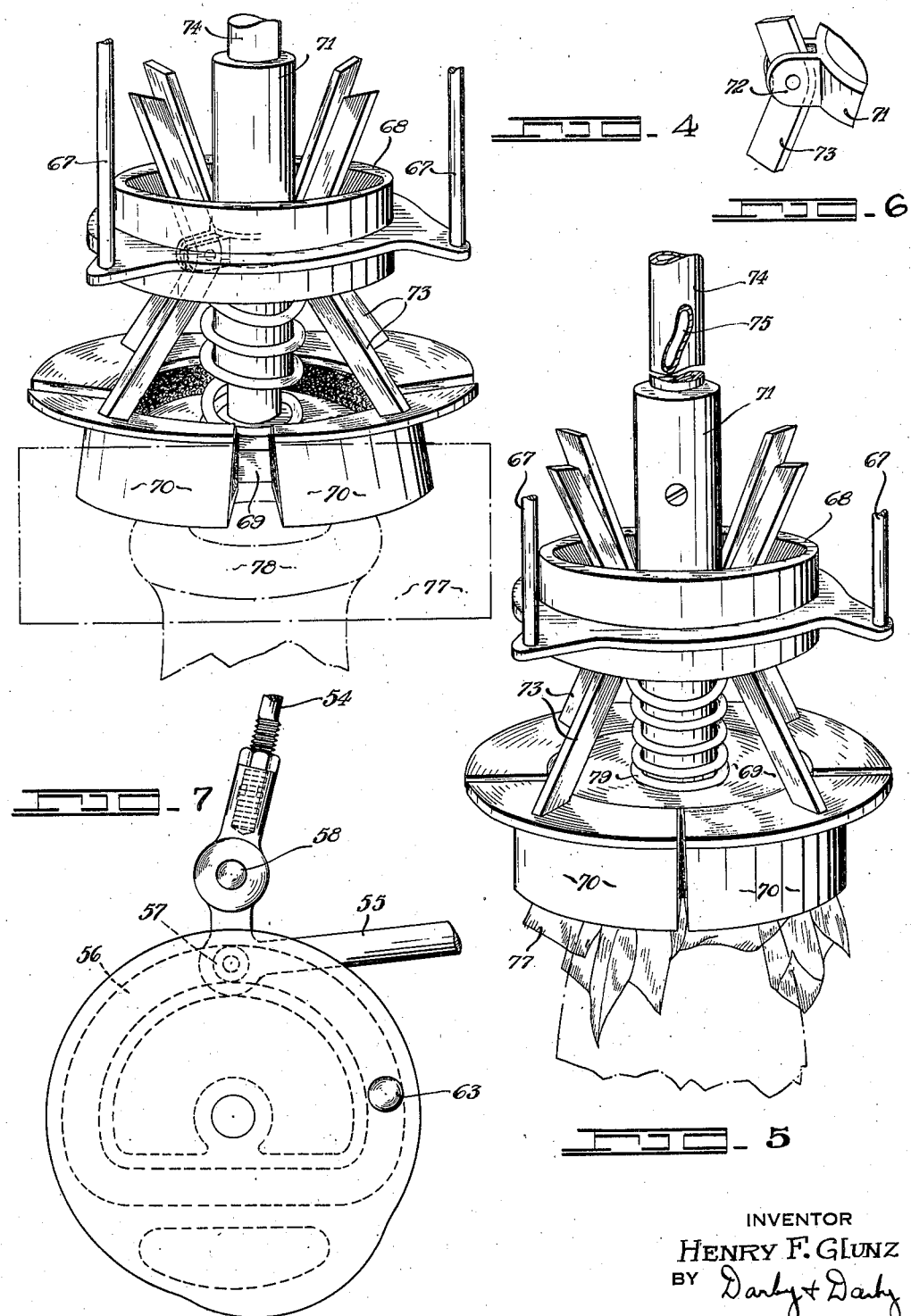
INVENTOR
HENRY F. GLUNZ
BY Darby & Darby
ATTORNEYS.

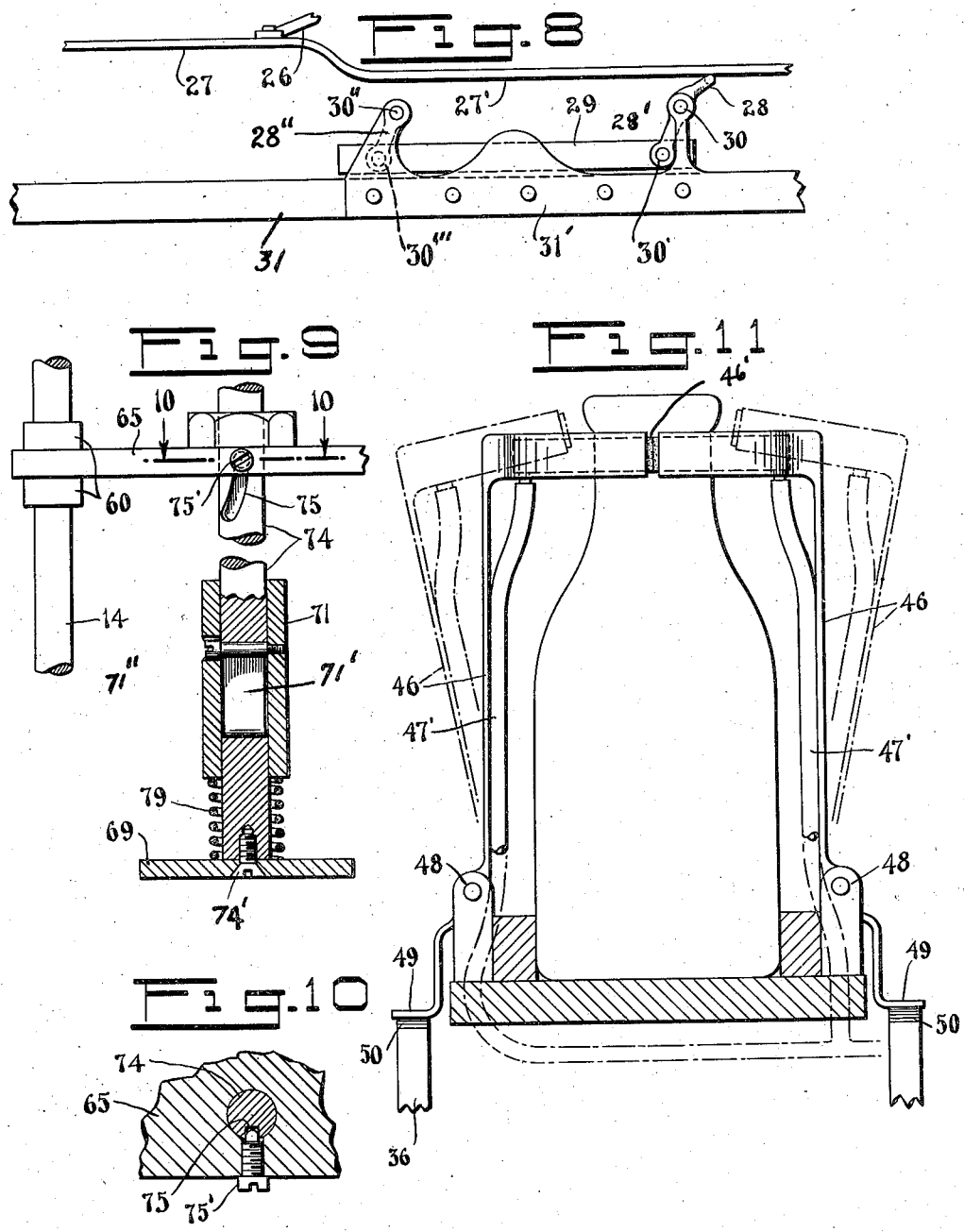

Patented Aug. 4, 1936

2,049,768

UNITED STATES PATENT OFFICE 2,049,768

MACHINE FOR CAPPING AND SEALING CONTAINERS

Henry F. Glunz, Greenfield Center, N. Y., assignor to Robert McMullen, New York, N. Y.

Application January 13, 1932, Serial No. 586,315

5 Claims. (Cl. 226—80)

The invention relates to a machine for capping and sealing containers and has for its object the provision of a machine for efficiently and economically capping and sealing milk bottles with transparent, flexible, non-absorbing, moistureproof caps which are formed over the mouth of the bottle and sealed to the neck thereof.

Another object includes the provision of a machine for sealing containers wherein I provide means for applying an adhesive to the neck of a filled milk bottle; I provide also means for supplying a sheet of the transparent, flexible, nonabsorbing, moisture-proof material on the mouth of the milk bottle or other container; means for holding said sheet over the mouth of the bottle and sealing the same on the neck thereof.

Other objects will appear hereinafter and I obtain these objects by a construction listed in the accompanying drawings, in which Figure 1 is an elevation in perspective of my improved machine viewed from the lefthand side and looking towards the discharge end of the machine. In this view the sealing head is in raised position;

Fig. 2 is an elevation in perspective viewed from the righthand side and looking toward the feed end of the machine. The sealing head is shown closed over the mouth of the bottle;

Fig. 3 is an elevation of a portion of the machine viewed from the lefthand side;

Fig. 4 is a view showing the sealing jaws open and ready to descend upon the sheet of transparent sealing material which is to be folded over the mouth of the bottle and sealed on the neck thereof;

Fig. 5 is a view showing the sealing jaws closed over the mouth of the bottle and sealing the formed cover on the neck thereof;

Fig. 6 is a detail of that portion shown in dotted lines of Fig. 4;

Fig. 7 is a view of the cam for operating the sheet shearing mechanism.

Fig. 8 is a broken detail view in side elevation, showing the arrangement of the means in the machine for gripping and advancing the cap forming sheet of material.

Fig. 9 is a detail sectional view showing certain of the parts of the sealing head of the machine and showing the manner in which the central supporting shaft of said head is mounted with respect to the upper spacing plate for the standards which support said head.

Fig. 10 is a view of Figure 9 taken on the line 10—10 looking in the direction of the arrows.

Fig 11 is a detail view in elevation showing the arrangement and operation of the adhesive applying means of the machine.

Like parts are designated by the same reference characters wherever they occur.

It is one of the prime purposes of my invention to provide a milk bottle capping and sealing machine which is certain in operation and whereby the milk bottles or other containers are capped and sealed by forming the sealing cap directly over the mouth of the bottle or other container and sealing the same on the neck thereof. Moreover, the cap is formed on and over the mouth of the bottle and is made from flexible, transparent, non-absorbing moisture-proof sheet material which is fed forward over the open mouth of the bottle and cut into proper lengths to form the sealing cap. To accomplish this the machine is provided with means for advancing the bottles to be sealed; means for feeding forward a sheet or strip of cap forming material; means for cutting suitable lengths from said sheet or strip to form a cap over the bottle on which the cut sheet is placed; means for applying an adhesive on the neck of the bottle; means for holding the cut sheet on the mouth of the bottle; means for folding the cut sheet over the mouth of the bottle and pressing the folds against the neck thereof; and means for timing the advance of the sheet with the advance of each successive bottle.

Referring now to the accompanying drawings as illustrative of a construction suited for carrying out the different objects of my invention, I provide a frame consisting of a base plate 10, a bed plate 11, and a spacing beam for uniting the bed plate onto the base plate. I also provide uprights 13 and standards 14.

The base plate is provided with spaced guard rails 15 and 16 between which the milk bottles or other containers are advanced through the machine. Any suitable means for advancing the containers through the machine may be utilized. For my purpose I provide a reciprocating bar 17 having thereon pivotally mounted levers 18 suitably spaced for receiving and advancing successive milk bottles or other containers. These levers are tensioned against a stop 19 by a spring or other tension device 20.

Rail 15 is provided with a recess 21 in which is positioned a trip member 22. This trip member, as will hereinafter be explained, is connected to, and causes the operation of, mechanism which effects the feeding of the cap forming material into position so that it may be capped on the bottle.

The trip member 22 is held in recess 21 of rail 15 by means of a spring 22' and is also secured to lever 23 which is carried at the lower end of bar 24. Bar 24 is mounted in a bracket 24' and has thereon a crank arm 25 to which is attached link 26 for operating a bar 27. The bar 27 has an offset portion 27' which normally engages with a trip lever 28 and causes the same to hold weight bar 29 suspended and out of contact with the strip of cap forming material.

The trip lever 28 is connected to the weight bar 29 by means of the link 28'. Link 28' is pivotally connected to said bar by means of the pivot 30' and is also pivotally secured as at 30 to an upwardly extending portion of the bracket 31' secured to the sheet feeding bar 31. The weight bar 29 is also connected to the bracket 31' by means of the link 28'' which is pivotally secured by pin 30'' to said bracket and to said bar by pin 30'''. It will be seen that this arrangement provides convenient means for gripping the sheet of cap forming material 40 and for advancing the same over the mouth of the bottle when the sheet feeding mechanism is caused to be actuated.

The sheet feeding bar 31 is adapted to be reciprocated, or moved back and forth, by a feed bar 32 which is supported in a bracket 33. (See Fig. 2.) The feed bar 32 is reciprocated by an arm 32' which in turn is actuated by means of a lever 34, arm 35 and disk 36 (Fig. 1). Disk 36 is carried on a journal 37 on the opposite end of which is fastened a pulley 38. The pulley 38 may be driven from any suitable source of power (not shown) which may be applied to shaft 39 (see Fig. 2).

When the sheet feeding mechanism is operated, the cap forming sheet material is advanced over a platform 42 (see Fig. 2), and is held in position by a weighted member 43. The sheet material is also supported on and is fed forward with the bar 31. The weighted member 43 is in the shape of a square bar pivotally supported near its ends by links 44. It will be apparent that this construction provides means for holding the sheet material against backward movement after it has been fed forward.

When an advancing bottle crowds against trip member 22, said trip member causes bar 24, crank arm 25 and link 26 to move the bar 27 so that its offset portion 27' will be moved out of the path of trip lever 28. When this occurs the weight bar 29 will be released from its suspended position and will grip the sheet of cap forming material so that it may be advanced towards its bottle capping position over the platform 42. When the bottle passes by the trip member 22, the offset portion 27' of bar 27 will be caused to again resume its position in the path of trip lever 28 and thus cause said lever 28 to again hold the sheet feeding weight 29 suspended and out of gripping contact with the cap forming sheet and so that the reciprocating sheet feeding bar 31 will not operate to feed said sheet.

It will be seen that by reason of the above described mechanism the feeding of the strip of cap forming material into capping position is caused to be timed with respect to the advance of the bottle to be capped, and said material is not fed forward except when a bottle moves past the trip member 22.

To provide means for adhering the flexible sheet material to the neck of the bottle or container, I supply adhesive applying mechanism comprising a container 45 and two oppositely disposed adhesive applying members or forks 46.

The container is supported on one of the uprights 13 and is connected by suitable means such as tubing to the adhesive applying members. Each of the adhesive applying members is provided with suitable adhesive spreading means such as a sponge, or brush 46' (see Fig. 11) which is located on the inner side of the fork so as to engage the neck of a bottle about to be capped and sealed. The adhesive material is supplied to the sponge or the like through suitable tubing 47 and branches 47'. One branch of the tube 47 supplies the adhesive spreading means on one side of the apparatus and the other branch supplies the spreading means on the other side. Each adhesive applying member or fork 46 is pivotally supported on a bracket 48 and has a foot 49 for engaging cam 50 on one side of the machine and cam 50' on the other side, thereby supplying the neck of the container with adhesive material from both sides.

After the adhesive is applied to the neck of the container it is moved to the cap applying position (see Fig. 2). In the meantime the sheet of transparent, flexible material has also been advanced a suitable distance to expose a sheet of sufficient length for the cap directly over the bottle. This sheet is now cut by a suitable mechanism such as a pivotally mounted knife 51 which is supported by links 52 from frame 53. The knife is operated by link 54 and cam lever 55 by a cam arrangement disclosed more fully in Fig. 7. This cam arrangement is provided on the inner side of disk 36 and comprises a cam groove 56 in which the cam roller 57 on the end of lever 55 moves so as to give up and down motion of lever 54 and in this manner move the end of the knife 51 up and down to cut off the sheet material. The cam lever 55 is connected to lever 54 by a joint 58.

The bottles are moved in a forward direction along the path indicated by the arrows in a step by step movement. After the adhesive is applied the bottle is moved into sealing position where the cap is formed and is sealed onto the neck of the bottle. For this purpose I have devised a mechanism as follows: On standards 14, I provide movable sleeves 59 which support plate 60 so as to be moved up and down on standards 14 by links 61 and 62. These links are connected respectively to disks 38 and 36 by means of screws 63. In order to allow for adjustment and flexibility I provide adjustable springs 64. The standards 14 are held in spaced relation by an upper plate 65 which is held by bushings 66.

Sealing ring 68 is carried from plate 60 by means of bolts 67. The sealing head comprises a central disk 69 and sealing jaws 70. The central sealing disk 69 is mounted on a supporting shaft 74 in any suitable manner such for instance as by a screw 74' (see Figure 9). The sealing jaws are held on a central shaft sleeve 71 by pivoted joints 72 and arms 73 as is best shown in Figures 4 and 6. Shaft 71 may be hollow and is held on the central supporting shaft 74 in which is provided a slot 71' by means of the screw 71''. The shaft 74 at its upper end is provided with a curved slot 75. The spacing plate 65, between the standards 14, is provided with a screw 75' the end 75 of which projects into the opening in said plate through which the shaft 74 extends. The end 75 of said screw is adapted to ride in said curved slot and causes said shaft 74 and consequently the sealing head to have a slight twist when closed down over the top of the container. The entire mechanism of the sealing head is supported in the spacing plates 60 and 65 as shown in Fig. 1. The shaft 74 is held in fixed relation on plate 60 by suitable means as by bushing 76. This provides means for moving the sealing head up and down with the motion of the plate 60.

The operation of the sealing head is as follows. After a bottle is placed in its capping and sealing position with the adhesive applied to the neck thereof, as described above, and a sheet of transparent material 77 placed over the mouth 78, the sealing head is moved from its open position (Fig. 4) to its closed position (Fig. 5) by reason of the motion of disks 36 and 38 and plate 60. That is to say the sealing head is moved from its open or raised position to its down or closed position. This motion causes the central sealing disk 69 to descend and press the sheet on the mouth of the bottle to thus hold the same. Spring 79 is thereby compressed and sealing ring 68 moved down to disengage the upper parts of arms 73 and engage the lower part thereof so as to close the sealing jaws 70 over the mouth of the bottle. This action will cause the flexible material to be folded over the mouth and neck of the bottle and press the same into engagement with the adhesive on the bottle neck.

During the downward closing movement of the jaws, a slight twist of the head is imparted thereto by reason of slot 75 to form a better seal. The jaws are held in closed position for a short interval of time during which the disks 36 and 38 move the connection of links 61 and 62 through the lower arc and during which interval of time the adhesive sets. With the upward movement of plate 60 the sealing jaws 70 are released, first by reason of the spring 79 pressing the sealing ring 78 in upward position and holding the disk 69 temporarily over the bottle and cap. As soon as the upward position is reached the bottle is moved forward by bar 17 and levers 18 because of the forward movement of said bar imparted thereby by the toggle joint member 80.

From the description above it will be apparent that containers may be sealed with transparent, flexible, non-absorbing, moisture-proof material in an efficient and continuous manner by supplying the containers to the machine in any suitable manner (not shown) and moving said containers through the machine by the reciprocating bar 17 and levers 18 engaging the bottles and moving the same forward with each stroke. During this operation the flexible, transparent sheet material is fed forward over the mouth of the bottle which has been supplied and has been moved into sealing position. The capping material is then pressed down on the mouth of the bottle while the sealing jaws descend and fold the material over the mouth and neck of said bottle and hold the same in position for a period of time sufficient to allow the adhesive to firmly engage the material and the bottle. The jaws are then opened and raised before the disk is moved upward by reason of the construction of the sealing head just described. As soon as the head has been fully moved to its upper position the bottle is moved forward and the next bottle placed in position.

If desired, the cap forming sheet may be embossed and dated in passing beneath guide sheet 81 by any suitable means applied at 82.

From the description given it is obvious that various details of construction will suggest themselves to those versed in the art. What I claim, therefore, as new and useful and desire to cover by United States Letters Patent is:

1. In a machine for capping and sealing a container, the combination of means for advancing the container into capping and sealing position, means for applying an adhesive to said container, means for feeding a flexible transparent cap forming sheet over the mouth of the container, means actuated by the container as it approaches its capping and sealing position, for rendering said cap forming sheet feeding means operative, and means for folding the cap sheet over the mouth and over the adhesive on said container when it is advanced to its capping and sealing position.

2. In a machine for capping and sealing milk bottles, the combination of means for advancing the bottles successively into a position to be capped and sealed, means for feeding a strip of flexible transparent cap forming material over the mouths of said bottles, means for cutting lengths from said material sufficient to form a cap on the bottle, means actuated by the bottle as it approaches in position to be capped and sealed, to render said cap forming sheet feeding means operative, means for applying adhesive to the neck of the bottle, means for folding the cut sheet over the mouth and neck of the bottles and over said adhesive as it arrives in position to be capped and sealed.

3. In a machine for capping and sealing containers, the combination of means for advancing the containers successively into a position to be capped and sealed, means for feeding a strip of flexible transparent cap forming material over the mouths of said containers, means for cutting lengths of said material sufficient to form a cap on the container, means actuated by the container as it approaches in position to be capped, to cause the feeding operation of the strip feeding means, means for applying adhesive to the container before it is advanced into the capping and sealing position, a sealing head for closing over said cut sheet and the neck of the bottle to fold the cut sheet over the mouth and neck of the container as it arrives in position to be capped and sealed, means associated with said sealing head to give it a twisting action as it closes over the neck of the container and means for actuating said sealing head to cause it to fold said cut sheet over the mouth and neck of the bottle.

4. In a machine for capping and sealing containers, the combination of means for advancing cap forming sheet material into position with respect to the container to be capped, means for arresting the operation of the sheet material advancing means, means for advancing the containers successively into capping and sealing position, means actuated by a container as it approaches its capping and sealing position to effect the operation of the arresting means for said sheet advancing means, means for applying adhesive to the neck of the bottle, means for forming said sheet material into a cap on said container and over said adhesive when said container is in its position to be capped and sealed, and means for preventing said arresting means for the sheet advancing means from operating when no bottle is in capping and sealing position.

5. In a machine for capping and sealing milk bottles, a sealing head comprising jaw members adapted to engage and surround the mouth of a milk bottle in sealing the same, a disc on which said jaw members close, a shaft for supporting said disc, a sleeve on said shaft, ears on said sleeve, arms pivoted on said ears, said arms each having an elbow as a pivot point, upper and lower arm portions disposed at an angle from said pivot point, a ring member contacting with said arms, means for feeding said bottles successively into capping and sealing position with respect to said sealing head, means for feeding a cap forming sheet of material into position over the mouth of said bottles and under said sealing head, means for applying adhesive to the neck of the bottles, means actuated by the bottles as they are fed into capping and sealing position for causing the operation of the sheet feeding means, and means for operating said sealing head, and for moving said ring member vertically up and down to thereby close and open said jaw members, to cause said jaw members to form said cap forming sheet of material into a cap on said container and to apply the cap to the neck of the bottle over the adhesive.

HENRY F. GLUNZ.